US 8,224,358 B2
Jul. 17, 2012

(12) United States Patent
Li

(10) Patent No.: US 8,224,358 B2
(45) Date of Patent: Jul. 17, 2012

(54) METHOD, DEVICE AND SYSTEM FOR IMPLEMENTING ONE CARD MULTIPLE NUMBERS SERVICE

(75) Inventor: Shiqian Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 945 days.

(21) Appl. No.: 12/242,193

(22) Filed: Sep. 30, 2008

(65) Prior Publication Data

US 2009/0034707 A1   Feb. 5, 2009

Related U.S. Application Data

(63) Continuation of application No. PCT/CN2007/001119, filed on Apr. 6, 2007.

(30) Foreign Application Priority Data

| Apr. 6, 2006 | (CN) | 2006 1 0072933 |
| Apr. 10, 2006 | (CN) | 2006 1 0072760 |
| Apr. 30, 2006 | (CN) | 2006 1 0079026 |

(51) Int. Cl.
*H04M 3/42* (2006.01)

(52) U.S. Cl. ........................ 455/461; 455/417

(58) Field of Classification Search .......... 455/413, 455/414, 417, 456.1, 456.2, 456.5, 461, 414.1, 455/414.2; 379/207.01, 207.02
See application file for complete search history.

(56) References Cited

U.S. PATENT DOCUMENTS

| 5,689,803 | A | * | 11/1997 | Tayloe | 455/12.1 |
| 5,806,000 | A | * | 9/1998 | Vo et al. | 455/466 |
| 6,167,264 | A | | 12/2000 | Palviainen et al. | |
| 6,944,445 | B2 | * | 9/2005 | Lee | 455/417 |
| 7,120,451 | B2 | * | 10/2006 | Agarwal et al. | 455/456.2 |
| 2005/0170854 | A1 | * | 8/2005 | Benco et al. | 455/461 |

FOREIGN PATENT DOCUMENTS

| CN | 1518383 A | 8/2004 |
| CN | 1642310 A | 7/2005 |
| CN | 1728745 A | 2/2006 |
| KR | 20050117875 A | 12/2005 |

OTHER PUBLICATIONS

International Search Report for International Application No. PCT/CN2007/001119, dated Jul. 19, 2007, with English Abstract thereof.
Chinese Office Action for Chinese Patent Application No. 2006100729337, dated Jan. 9, 2009, and partial English translation thereof.

* cited by examiner

*Primary Examiner* — Ajit Patel
*Assistant Examiner* — Myron K Wyche

(57) ABSTRACT

A method for realizing one card for multi-number service is disclosed, wherein the subscriber's card of the called terminal has a plurality of numbers, and the method comprises: determining the subscriber card information of the called terminal, the present activated number and the mobile switch center MSC_S based on the called number; connecting the call to the MSC_S based on the obtained routing information of the said MSC_S, and then performing the subsequent connection of the call based on the called subscriber card information. When calling a user experiencing one card for multi-number service, regardless the telephone number the user registers, the connection to the number that the user currently uses could always be realized, so as to obtain the calling or short message service targeted to the one card for multi-number service, that is, a plurality of number could be online concurrently.

21 Claims, 7 Drawing Sheets

METHOD, DEVICE AND SYSTEM FOR IMPLEMENTING ONE CARD MULTIPLE NUMBERS SERVICE

CROSS-REFERENCE TO RELATED APPLICATIONS

This application is a continuation of International Application No. PCT/CN2007/001119, filed Apr. 6, 2007. This application claims the benefit and priority of Chinese Applications Nos. 200610072933.7, filed Apr. 6, 2006; 200610072760.9, filed Apr. 10, 2006; and 200610079026.5, filed Apr. 30, 2006. The entire disclosures of each of the above applications are incorporated herein by reference.

FIELD

The present disclosure relates to the field of communication technologies and to a method, a device and a system for implementing one card multiple numbers service.

BACKGROUND

This section provides background information related to the present disclosure which is not necessarily prior art.

The one card multiple numbers service refers to correspondence of one terminal to multiple numbers. That is, multiple numbers public to the outside are bound with one terminal in such a way that dialing any of the numbers by another user can make the terminal ring, and the current call between the caller and the callee will be connected, or a short message transmitted to any of the numbers can be received by the terminal, so that communication with the terminal or transmission of a short message to the terminal can be realized. When the user of the terminal acts as a caller, one of the numbers can be selected for initiation of a call or transmission of a short message as required by the user, and also one of the numbers can be selected for display on a terminal of the callee as required by the user.

When a one card multiple numbers service user is called, a proximity to a caller may be achieved because a call can be initiated to any registered number of the one card multiple numbers service user, and even if the caller and the callee are not in the same city, the calling user can communicate with a number that the callee registers in a city where the calling user is, so that the calling user can have a feel of proximity that the callee is in the same city as the city where the calling user is. A user can set local contact phone numbers for respective cities as needed and then bind the local contact phone numbers for the cities on the same terminal. A dialing client from any of the cities may feel as if the user were in the same city as the city where he is and thus have a feel of proximity.

Currently, the proposed one card multiple numbers service is implemented based upon an approach of burning multiple numbers on one SIM card and such an approach may be limited in the amount of numbers due to a limited capacity of the SIM card. Furthermore, only one number can be in use at a time and more than one number cannot be used concurrently. An additional resort to a wireless communication operator or a business hall for replacement or update of the SIM card may be required, and this may be adverse to extensive deployment of the service. Or, the approach may be put into practice only with significant adaptation of devices in the whole network.

An one card multiple numbers service user to answer a call or in reception of a short message may some times wish to be aware of which of the numbers registered by the callee a calling user dialed so as to substantially determine which category of users the caller belongs to (different numbers registered by the one card multiple numbers service user may be provided with respect to different categories of user, such as a business category, a friend category.) and thereby to decide whether to answer the call and what will be talked about. For example, a one card multiple numbers service user may be provided with two numbers, one of which is used for business, the other of which is used for friends, and both of which are associated with a current terminal. Upon reception of a telephone call at a user's office or in an office meeting, the user may be unable to determine whether it is a call from a client or a friend (e.g., in the case of an unfamiliar telephone number). As can be readily appreciated, answering of a call from a friend may be not appropriate in such a scenario, but a good chance might be missed if the call was not answered but relates to an important business. If the user can be aware of whether his registered business category or friend category to which the call from the caller belongs, then he can judge whether the call is incoming from a friend or a client and then decide whether to answer the current call.

In the other aspect, when dialing back directly for a call or a short message with reference to an answering record of a terminal, a one card multiple numbers service user may wish during dialing back to display to a callee a number that is the number the callee ever dialed. For example, when dialing back for a call from a friend in an answering record of a terminal, a one card multiple numbers service user may wish to still display to the friend one of the numbers which is registered in the friend category (i.e., the number that the friend ever dialed) instead of any of his other registered numbers. In this way, a different category of numbers can be provided only to a specify category of users, and also the use of a number ever dialed by a callee can facilitate identification of the number by the callee so that the callee can be aware of the identified number is not a strange number.

However, neither the function of displaying a number that a callee ever dialed nor the function of displaying, while dialing back, with automatic association a number that a callee ever dialed has been provided yet.

SUMMARY

This section provides a general summary of the disclosure, and is not a comprehensive disclosure of its full scope or all of its features.

Embodiments provide a method and a system for implementing one card multiple numbers service so that a user of the one card multiple numbers service can use any of registered numbers for communication.

An embodiment provides a method for implementing the one card multiple numbers service, in which a called terminal has a subscriber card bound with multiple numbers, including:

receiving a call directed to a called number and determining subscriber card information of the called terminal, a current activated number and a serving Mobile Switching Center (MSC_S) that provides services for the activated number according to the called number;

obtaining routing information of the MSC_S; and connecting the call to the MSC_S according to the routing information and performing subsequent connecting of the call according to the subscriber card information of the callee.

An embodiment provides a method for implementing a short message service for a one card multiple numbers service user, including:

receiving a short message carrying a called number;

determining subscriber card information of the called number and a serving Mobile Switching Center MSC_S that provides services for the user according to the called number and determining routing information of the short message;

sending the short message to the MSC_S according to the routing information; and performing, by the MSC_S, subsequent transmission of the short message.

An embodiment provides a method for implementing a short message service for one card multiple numbers service, in which a called user has a subscriber card bound with multiple numbers, a Gateway of Message Center (GMC) is arranged to record a called number to be transferred to in accordance with the current called number, and the method includes:

receiving a short message initially sent to a callee and routing the short message to a GMC to which the called number is homed;

determining, by the GMC, a transfer-to number, according to the called number, and reconstructing and issuing the short message to a GMC or a short message server to which the transfer-to number is homed; and performing subsequent transmission of the short message according to subscriber card information of the callee.

An embodiment provides a method for implementing a short message service for one card multiple numbers service, in which a subscriber card of a called user is bound with multiple numbers, a Short message routing Signaling Gateway SSG is arranged to record a transfer-to called number for the called number, and the method includes:

receiving a short message initially sent to a callee and sending to the SSG a signaling for querying about a user short message address, the signaling carrying a called number;

determining, by the SSG, a transfer-to number according to the called number and reconstructing and forwarding the signaling for querying about the user short message address to an HLR to which the transfer-to called number is homed; and determining short message routing and performing subsequent transmission of the short message according to subscriber card information of the callee.

An embodiment provides a method for dialing back by a user. When a terminal of a second user of one card multiple numbers service acting as a callee receives a call, number information of the second user called by a first user and a number of the first user are displayed on the terminal, and the method includes:

receiving a dial back call made from the second user, the dial back call carrying the number of the second user initiating the dial back call and the number of the first user; and confirming the number of the second user and the number of the first user and making the call with the confirmed number of the first user being as a called number.

An embodiment provides a method for transmitting a short message, in which a subscriber card of a calling user is bound with multiple numbers and the method includes:

carrying, by a calling user terminal when transmitting a short message, telephone number information to be displayed to a called user; and after receiving the short message transmitted from the caller, adding, by a Message Center MC to which the calling user is homed, content of a transmitter telephone number field of the short message into a corresponding field to be displayed to the called user when transmitting the short message.

An embodiment provides a system for implementing one card multiple numbers service, including:

a primary Home Location Register HLR, adapted to store information of all numbers registered by a one card multiple numbers service user, and upon reception of a call for a callee, determine subscriber card information of a called terminal, a current activated number and a serving Mobile Switching Center MSC_S that provides services for the activated number according to a called number, and obtain routing information of the MSC_S so as to connect the call to the MSC_S;

a secondary Home Location Register HLR, adapted to store address and/or routing information of the primary HLR to which the one card multiple numbers service user is homed; and a Gateway Mobile Switching Center (GMSC), adapted to receive the call directed to the called number, determine the subscriber card information of the called terminal, the current activated number and the serving Mobile Switching Center (MSC_S) that provides services for the activated number by querying the secondary HLR and/or the primary HLR according to the called number, and connect the call to the MSC_S.

An embodiment provides a control device for implementing one card multiple numbers service, including:

a storage unit, adapted to store information of numbers registered by a one card multiple numbers service user;

a determination unit, adapted to determine whether a called number is one of the numbers of the one card multiple numbers service user; and a processing unit, adapted to process connecting of a call for the one card multiple numbers service user, determine subscriber card information of a called terminal, a current activated number and a Serving Mobile Switching Center MSC_S that provides services for the activated number according to the called number and based upon the stored information of the numbers registered by the one card multiple numbers service user, and obtain routing information of the MSC_S so as to connect the call to the MSC_S.

An embodiment provides a short message system for implementing one card multiple numbers service, including a short message reception module and a short message transmission module, and the system further includes:

a number index module, adapted to store different telephone numbers registered by a user of the one card multiple numbers service and corresponding different indexes;

a checking module, adapted to determine whether number transformation is required for a short message transmitted from the short message reception module, read a telephone number corresponding to an index field from the number index module, and transmit the telephone number along with the short message to a number transformation module upon determination of a need of number transformation; and a number transformation module, adapted to transform a calling telephone number in the short message transmitted from the checking module into the telephone number corresponding to the index field, and provide the short message to the short message transmission module for transmission.

In the solutions for implementing the one card multiple numbers service as proposed according to the embodiments, during calling the user of the one card multiple numbers service, the call may be connected to a number currently used by the user regardless of which of telephone numbers registered by the user is called so as to implement a communication or short message service with the callee of the one card multiple numbers service, that is, the multiple numbers of the callee may be made online concurrently.

Further, the one card multiple numbers service user may use a number registered in a local network where he is currently visiting so as to put it in a non-roaming status. One of the numbers which is registered by the callee in the same local network as the caller can be called, so that the caller can feel as if the callee were still in the present city and thus a feel of proximity can be achieved.

Further, when a short message is transmitted to any of registered numbers by the callee of the one card multiple numbers service, the short message may be transmitted to a number currently used by the called user so as to implement a short message service with the callee of the one card multiple numbers service, that is, the multiple numbers of the callee may be made online concurrently.

When the one card multiple numbers service callee is not in the same city as the caller, the caller may transmit a short message to one of the numbers which is registered by the callee in the same city as the caller.

The present disclosure also proposes a method for displaying to a callee a number called by a caller and dialing back, so that when a one card multiple numbers service user acting as a callee is to answer a call, one of the numbers registered by the callee that the caller is calling may be displayed, and thus the user can substantially determine which category of users the caller belongs to (different numbers registered by the one card multiple numbers service user can be provided for different categories of users) so as to decide whether to answer the call and what will be talked about.

When directly dialing back with reference to an answering record of a terminal, the one card multiple numbers service user may display to the callee a number that is the number the callee ever dialed. Thus, different categories of numbers may be provided exclusively for a specific category of users. Since the displayed number is the number that the callee being dialed back ever dialed, the callee can readily identify the number.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
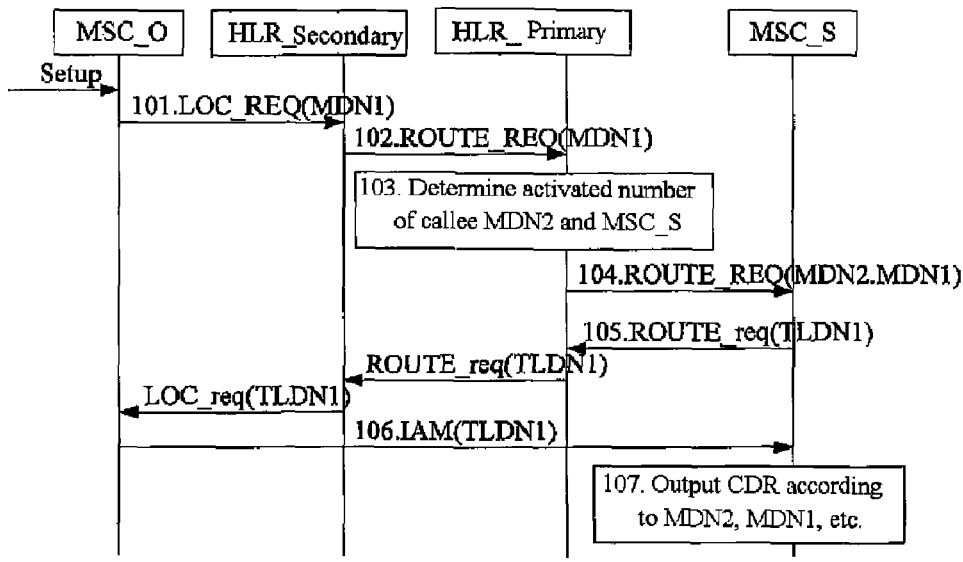
FIG. 1 is a flow chart of a one card multiple numbers service for a callee according to an embodiment.

Example embodiments will now be described more fully with reference to the accompanying drawings.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

Embodiments are described below with reference to the accompanying drawings of the description.

A user of one card multiple numbers service subscribes to the service in advance. For convenient description, it is assumed that a user applies for a one card multiple numbers service with n numbers bound with one card and that the n numbers are homed respectively to different HLRs which are referred to as secondary HLRs, while an HLR responsible for provision of the one card multiple numbers service will be referred to as a primary HLR, which may be one of the secondary HLRs. Although provision of the one card multiple numbers service on the primary HLR is described in the embodiments as an example, other devices such as a Service Control Point (SCP) device of an intelligent network may also provide the one card multiple numbers service.

An account is opened for each number respectively at one of the secondary HLRs to which that number is homed (in the same procedure as that for opening an account for a general user), and an authentication function of the secondary HLR may be removed for the user for which an account is to be opened. All of the applied n numbers are recorded on the primary HLR. The primary HLR also notifies each secondary HLR of its address (or routing information) for enabling the secondary HLRs to route properly to the primary HLR. For example, routing information may be notified of as follows: the primary HLR simulates MSC/VLR to send to each secondary HLR a registration message in which an address field of the MSC/VLR/short message is filled with address information of the primary HLR and the field for information of a receiving user is filled with information of each secondary number, and thus each secondary HLR may receive and record the routing information of the primary HLR corresponding to the respective secondary number. An address of a currently serving MSC/VLR on the secondary HLR may also be set as an address of the primary HLR through a Business Operation Support System (BOSS).

A number currently used by a called user is referred to as an activated number, and an MSC serving the activated number is referred to as a serving MSC (represented by MSC_S). While a user is being served by a MSC_S, a called terminal initiates a registration request, which contains information of the serving MSC_S for a subscriber card of the called terminal, to the primary HLR through the MSC_S, and the primary HLR determines an activated number according to a preset policy, which may depend on the information of the MSC_S or the information of a location where the user is.

Reference can be made to the patent application No. 200410101760.8 filed by the inventor for a flow of a one card multiple numbers service for a caller, and descriptions thereof will not be repeated here. The present disclosure provides a method for implementing a flow of a one card multiple numbers service for a callee, which will be described in details below.

Firstly, the present disclosure will be described with reference to FIG. 1 illustrating an embodiment for a one card multiple numbers service for a callee including the following processes.

Process 101: A GMSC (i.e., an original MSC_O as shown, which will apply below unless stated otherwise) receives a message for dialing a number MDN1 of a user with subscription to a one card multiple numbers service, and initiates a location request (LOC_REQ) carrying the MDN1 to a secondary HLR (identification of a secondary HLR is for the purpose of distinguishing from a primary HLR with provision of the one card multiple numbers service) to which the called user number MDN1 is homed.

Process 102: Since the address of the primary HLR has been set on the respective secondary HLRs during opening an account for the one card multiple numbers service, the secondary HLR initiates a routing request (ROUT_REQ) carrying information of the MDN1 to the primary HLR after receiving the location request carrying the MDN1.

Process 103: After receiving the routing request, the primary HLR is aware of that the call currently occurring is a one card multiple numbers service according to subscription information, and searches according to the MDN1 for a subscribe card to which the called user is homed (or a bound subscriber card), which carries subscriber card information including a subscriber identity code ID and a subscriber registered number such as an International Mobile Subscriber Identifier (IMSI) or a Mobile Identification Number (MIN), and further determines an activated number MDN2 currently used by the callee and a serving MSC for the number (i.e., MSC_S).

Process 104: The primary HLR initiates a routing request (ROUT_REQ) to the determined MSC_S of the callee. The ROUT_REQ carries parameters including the MDN1 and the MDN2, and some service indication information indicative of that the call is a terminating call for one card multiple numbers service may also be included.

Process 105: After receiving the routing request, the MSC_S records the information in the request and assigns a temporary local number TLDN1 carrying routing information of the MSC_S to the current call.

Then, the MSC_S sends the TLDN1 back to the GMSC initiating the location request though the primary HLR and the secondary HLR.

Process 106: After receiving the TLDN1, the GMSC routes the call to the MSC_S of the callee according to the routing information in the TLDN1.

In a subsequent process of connecting to the called terminal, the International Mobile Subscriber Identifier (IMSI) or the Mobile Identification Number (MIN) will be used to connect the call to the called terminal. Such subsequent connecting process is the same as a general connecting process, and therefore descriptions thereof will not be repeated here.

After setting up a speech path to the callee, the MSC_S outputs a charging record of Call Detail Record (CDR) for the callee according to the recorded MDN1 and MDN2 for charging for the callee of the one card multiple numbers service.

Figure 2:
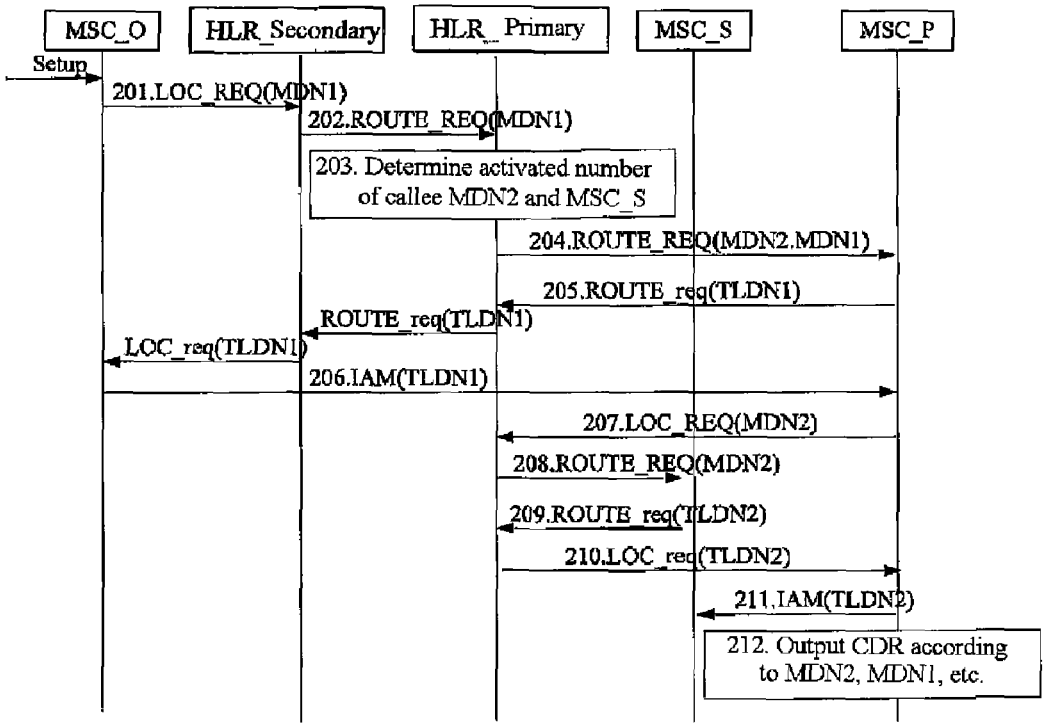
FIG. 2 is a flow chart of a one card multiple numbers service for a callee according to another embodiment.

In the above embodiment, the charging record of Call Detail Record (CDR) is output from the MSC_S of the callee. Alternatively, a pilot MSC (denoted with MSC_P) may also be arranged in the network to forward a call from the primary HLR to the MSC_S and to record a called number and a called activated number for an output of a CDR charging record. An one card multiple numbers service for a callee in this scenario will be described below with reference to a flow of another embodiment as illustrated in FIG. 2 including the following processes.

Processes 201~203: These processes are identical to the processes 101~103.

Process 204: Then, the primary HLR initiates to the MSC_P a routing request (ROUT_REQ) carrying information of the called number MDN1 and the current activated number MDN2 of the callee, and also a service identifier related to call pilot (e.g., a call pilot identifier for one card multiple numbers service).

Process 205: After receiving the routing request, the MSC_P records the information including the MDN1 and the MDN2 in the message, and also assigns a temporary local number TLDN1 to the current call.

Then, the MSC_P sends the TLDN1 back to the GMSC initiating the location request through the primary HLR and the secondary HLR.

Process 206: After receiving the TLDN1, the GMSC routes the call to the MSC_P according to the routing information in the TLDN1.

Process 207: Then, the MSC_P requests the primary HLR for the routing information of the MSC_S for the MDN2.

Processes 208~210: The primary HLR sends a routing request to the MSC_S, and the MSC upon reception assigns a temporary local number TLDN2 to the current call and returns the TLDN2 to the MSC_P through the primary HLR.

Process 211: The MSC_P receives the TLDN2 returned from the MSC_S through the primary HLR and connects the call to the serving MSC of the callee according to the routing information contained in the TLDN2.

The subscriber card information of the callee such as the IMSI or MIN will be used for conducting the subsequent process of connecting to the called terminal. This subsequent connecting process is the same as a general connecting process, and therefore descriptions thereof will not be repeated here.

After setting up a speech path to the callee, the MSC_P outputs a CDR charging record for the callee according to the recorded MDN1 and MDN2 for charging for the callee of the one card multiple numbers service.

Figure 3:
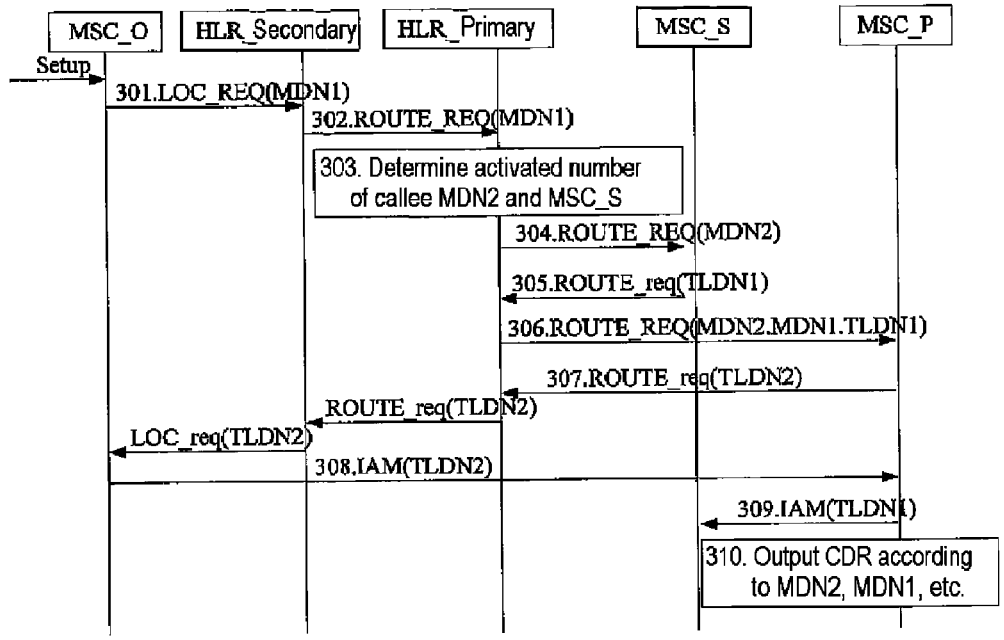
FIG. 3 is a flow chart of a one card multiple numbers service for a callee according to another embodiment.

In the above example, firstly connecting between the GMSC and the MSC_P is established and then the MSC_P is informed of the routing of MSC_S during conducting the connection for the callee of one card multiple numbers service. Of course, the process of informing the MSC_P of the routing of MSC_S can be arranged prior to the process of conducting the connecting for the GMSC and the MSC_P, and therefore the following processes can be involved with reference to a flow of another embodiment as illustrated in FIG. 3.

Processes 301~303: These processes are identical to the processes 101~103.

Processes 304~305: The primary HLR requests the determined MSC_S for routing information, and the MSC_S upon reception assigns a temporary local number TLDN1 to the current call and returns the TLDN1 to the primary HLR.

Process 306: Then, the primary HLR initiates to the MSC_P a routing request (ROUT_REQ) carrying information of the called number MDN1, the current activated number MDN2 of the callee and the TLDN1 returned from the MSC_S, and also a service identifier related to call pilot (e.g., a call pilot identifier for one card multiple numbers service).

Process 307: After receiving the routing request, the MSC_P records the information including the MDN1, the MDN2 and the TLDN1 in the message, and also assigns a temporary local number TLDN2 to the current call and identifies the TLDN1 as being assigned for the call pilot.

Then, the TLDN2 is sent back to the GMSC initiating the location request through the primary HLR and the secondary HLR.

Process 308: After receiving the TLDN2, the GMSC routes the call to the MSC_P according to the routing information in the TLDN2.

Process 309: After receiving the call, the MSC_P connecting the call to the serving MSC of the callee according to the routing information contained in the recorded TLDN1.

The subscriber card information of the callee such as the IMSI or MIN will be used for conducting the subsequent process of connecting to the called terminal. Such subsequent connecting process is the same as a general connecting process, and therefore descriptions thereof will not be repeated here.

After setting up a session path to the callee, the MSC_P outputs a CDR charging record for the callee according to the recorded MDN1 and MDN2 for charging for the callee of the one card multiple numbers service.

Figure 4:
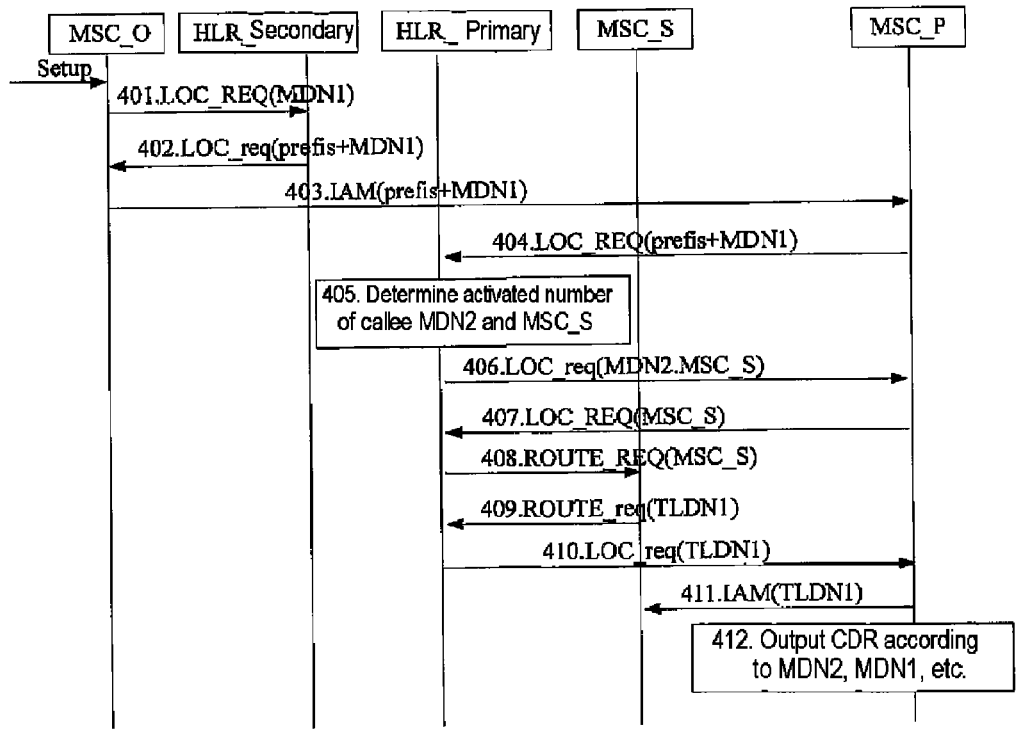
FIG. 4 is a flow chart of a one card multiple numbers service for a callee according to another embodiment.

If the routing information of the pilot MSC_P is recorded on each HLR, then the GMSC can also establish a process of connecting with the MSC_P directly according to the routing information recorded on the secondary HLR, and therefore the following processes can be involved with reference to FIG. 4.

Process 401: This process is identical to the process 101.

Process 402: After receiving the location request, the secondary HLR retrieves a stored preset forwarding number (which is a number with specific information including service information and the information on routing to the MSC_P) according to the MDN1, determines the routing information of the MSC_P and returns the forwarding number containing the routing information to the GMSC.

Process 403: The GMSC routes the call to the MSC_P according to the routing information in the forwarding number through an IAM message containing the information of the forwarding number and the called number MDN1 for the call.

Process 404: After receiving the IAM message, the MSC_P sends to the primary HLR a location request carrying the forwarding number and the MDN1.

Process 405: After receiving the location request, the primary HLR is aware of that the call currently occurring is the one card multiple numbers service according to subscription information, searches for a number registered by the called user according to the MDN1, and determines an activated number MDN2 currently used by the callee and an MSC serving the number (i.e., MSC_S).

Process 406: Then, the primary HLR returns the activated number MDN2 of the callee and an indication of the one card multiple numbers service to the MSC_P.

Processes 407~410: The MSC_P sends a location request to the primary HLR again for requesting the routing information of the MSC_S. The MSC_P can sends a location request to the primary HLR again according to either a related trigger or the service indication returned from the primary HLR.

After receiving the request, the primary HLR requests the MSC_S for the routing information, the MSC_S assigns a TLDN1 and returns the TLDN1 to the primary HLR, and the primary HLR returns the TLDN1 to the MSC_P.

Process 411: The MSC_P routs the call to the serving MSC_S according to the routing information in the received TLDN1.

The subscriber card information of the callee such as the IMSI or MIN will be used for conducting the subsequent process of connecting to the called terminal. Such subsequent connecting process is the same as a general connecting process, and therefore descriptions thereof will not be repeated here.

After setting up a speech path to the callee, the MSC_P outputs a CDR charging record for the callee according to the recorded MDN1 and MDN2 for charging for the callee of the one card multiple numbers service.

It shall be noted here that the MSC_P sends a location information request to the primary HLR twice (the first location information request in the process 405 and the second location information request in the process 407) in the above example. Indeed, one location information request can also be possible. But in order to avoid interaction and confliction between services, two location information requests have been included in the present embodiment in which a response to the first location information request carries an indication of the one card multiple numbers service (a general service indication is returned in a second response in the case of two location information requests and in a first response in the case of one location information request). Generally, an HLR carries a trigger in the first response message typically without service information upon determination of being a user with subscription to the trigger. According to the present disclosure, however, in order to distinguish from other services and avoid confusion of the services, the HLR carries information indicative of the one card multiple numbers service in the first response upon determination of presence of subscription to a location trigger (of course, subscription to other triggers can also be possible) for a primary card, thereby avoiding confliction with other already existing services and reducing interaction complexity.

In the above, the primary HLR sends its address to the respective secondary HLRs during registration so that the respective secondary HLRs in reception of a call directed to the callee sends a routing request to the HLR and sends the called number of the call to the primary HLR. Alternatively, forwarding is arranged at the secondary HLRs so as to send a location request to the primary HLR upon reception of a call. Further, an address of the serving MSC/VLR for the MDN1 can also be set on the respective secondary HLRs as an address of the primary HLR, so that the secondary HLRs may regard the primary HLR as the current serving MSC/VLR for the MDN1 and send the called number of the call to the primary HLR in a routing request.

The MSC_P in the above respective embodiments may be physically or logically present and may be separate or integrated with other MSCs.

As can be seen from the above embodiments, the proposed method for the one card multiple numbers service enable connecting with success for any registered number of a called user being called regardless of which number currently used by the user (the currently used number is an activated number).

Further in the above embodiments, the MSC_P capable of pilot is adapted to provide a charging record to a billing center so as to implement a post-pay service. Alternatively, a provided real time charging record may also be used for a pre-pay service, and the charging record shall be provided to a network device that records real time fee deduction Further, respective numbers may be registered at Message Centers (MC) to which they are homed respectively. According to the present disclosure, when a short message is sent to a number of a callee, the Message Center (MC) to which the called number is homed transmits the short message to the MSC_S that provides service for a subscriber card of the callee, that is, the serving MSC_S that provides service for the current activated number of the called user, and the MSC_S transmits the short message to a user terminal. A method for implementing a short message service for a one card multiple numbers service will be described in details below.

A flow of transmitting a short message for a one card multiple numbers service for a caller may be identical to that of transmitting a general short message. That is, with a currently used activated number being as a telephone number (MDN) for transmission and reception of a short message, the MSC that provides service for the caller transmits a short message to the message center to which the caller is homed according to a Mobile Station Identifier (MSID) of a subscriber card of a calling terminal.

Further, some accessorial services can also be added so that the calling user may display a different calling MDN to the callee. It can be found that the short message is sent to a secondary number of the caller according to a number selected by the caller (information of a selected calling MDN shall be carried in the initial short message) or in a short message previously received by the caller, and then the caller carries information of the secondary number when the caller replies to the short message so that a number displayed to the callee is the secondary number. Thus, the callee may feel that it is the secondary number that is used in communication with the callee.

The accessorial service can be implemented in such a way that the user sends to the MC to which the caller is homed currently the information of a calling MDN (an index, a number, of the MDN) to be sent to the callee for display, and the homing MC determines an MDN to be used as the information of a calling MDN according to the information of a selected calling MDN. Specifically, the information of the MDN to be displayed can be carried in the following ways.

A. A special process can be preformed in a content field of a short message. For example, the content may start with special content, such as the field of XZCLI*xxx* plus normal content of a short message. When receiving the initial short message, the MC determines that the user is a one card multiple numbers service user and then parses content of the short message. When a specific number header beginning negotiated in advance is found, such as XZCLI*xxx*, the MC searches out a corresponding MDN through the latter xxx index, and then replaces the current calling number MDN in the short message with the corresponding MDN, removes the field of XZCLI*xxx* and transmits the constructed short message to a destination. The xxx may be a serial number or a city code corresponding to a secondary number, which shall be in correspondence with a secondary number of the user.

B. Some information may be carried before a receiver telephone number field in a short message, such as a field of *xxx# plus a called number. The message center in reception of an initial short message determines that the function of replacing a calling MDN is subscribed to according to subscription information of the user or determines a need of replacing the calling number according to the prefix of the called number in the short message, and then performs replacement as appointed in advance in the same replacement process as described above in the process A and modifies the called number in the short message with deletion of the prefix.

A flow of receiving a short message for a callee may involve the following processes after the short message is transmitted to a Message Center (MC) to which a called number is homed according to the called number.

Figure 5:
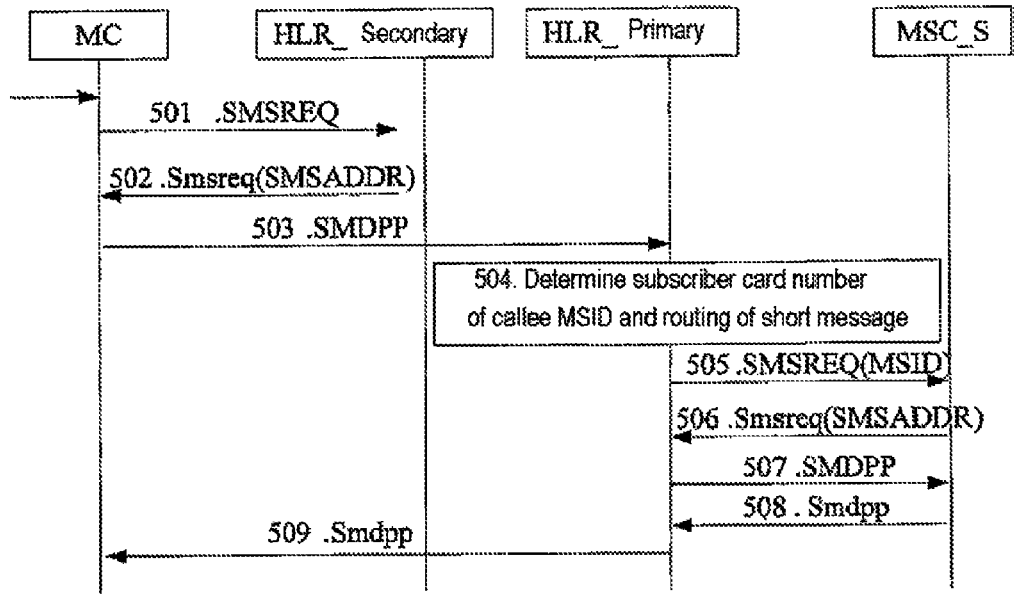
FIG. 5 is a flow chart of receiving a short message according to another embodiment.

The following processes may be involved firstly with reference to a flow of receiving a short message for a callee as illustrated in FIG. 5.

Process 501: After receiving a short message, the MC to which the called number MDN1 is homed initiates to a secondary HLR to which the called user number MDN1 is homed a short message request (SMSREQ) carrying the MDN1 or a called MSID for obtaining a short message reception address.

Process 502: Since the address of the primary HLR has been set on the respective secondary HLRs during opening an account for the one card multiple numbers service, the secondary HLR returns the address of the primary HLR registered by the caller as the short message reception address to the MC after receiving the short message request carrying the MDN1 or MSID.

Process 503: After receiving a response message (Smsreq), the MC sends the short message to the primary HLR through an SMDPP message according to the short message reception address (filled as the address of the primary HLR) carried in the response message.

Process 504: After receiving the SMDPP message, the primary HLR is aware of that the service currently occurring is a one card multiple numbers service according to subscription information, searches for the information of the subscriber card to which the called user is homed (or the bound subscriber card) according to the MDN1 or MSID, and further determines the MSC that provides services for the user (i.e., MSC_S). It shall be noted that the flow will be directed to a process 507 if the primary HLR is aware of current routing information of the short message (e.g., an address of the MSC_S).

Process 505: The primary HLR initiates to the determined MSC_S of the callee a short message request (SMSREQ) carrying the MSID for obtaining the short message reception address.

Process 506: After receiving the request, the MSC_S returns a response message of Smsreq carrying the short message reception address (filled as the address of the MSC_S).

Processes 507~509: The primary HLR sends the short message to the MSC_S through an SMDPP message according to the current routing address of the short message. After receiving the short message, the MSC_S returns through the primary HLR to the MC a response message indicative of reception of the short message.

In a subsequent process of issuing the short message from the MSC_S to the called terminal, the short message is issued according to the subscriber card information of the callee such as the International Mobile Subscriber Identifier (IMSI) or the Mobile Identification Number (MIN). Such subsequent connecting process is the same as a general connecting process, and therefore descriptions thereof will not be repeated here.

Of course in the present embodiment, it is possible to set the number of the called terminal as a subscriber card number MSID of the called user in the MC, and thus the MC may determine the address of the primary HLR to which the MSID is homed directly according to the MSID and send directly a short message routing request to the primary HLR, and the subsequent flow is the same as a general short message flow.

In addition, if secondary numbers are divided by number segment, then both a short message forwarding function and an MSID for transferring to the called user may be arranged in the MC, and thus the MC may also send a short message routing request to the primary HLR according to the MSID.

Figure 6:
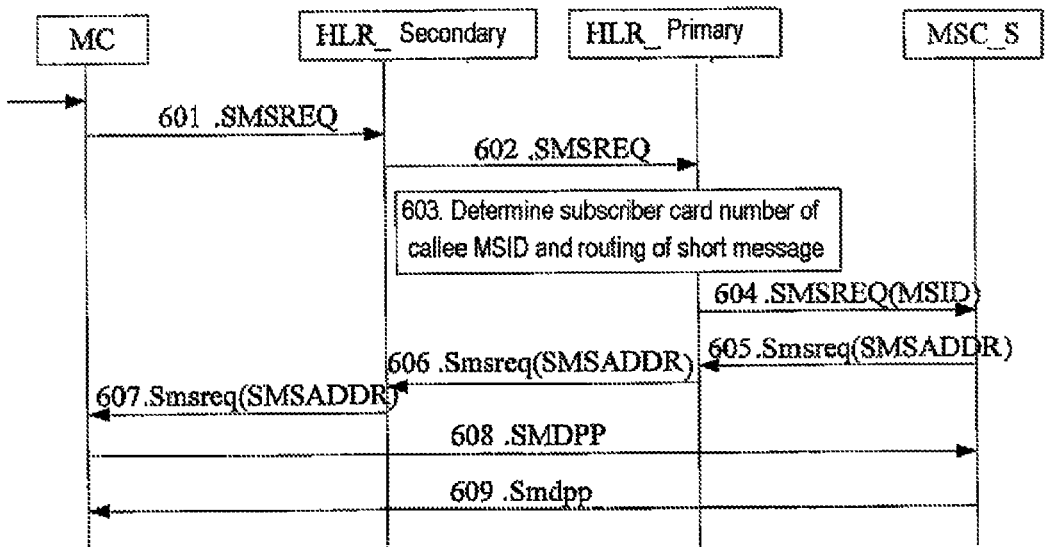
FIG. 6 is a flow chart of receiving a short message according to another embodiment.

The present disclosure is described below with reference to another embodiment of a one card multiple numbers service for a callee as illustrated in FIG. 6 including the following processes.

Process 601: After receiving a short message, the MC to which the called number MDN1 is homed initiates to a secondary HLR to which the called user number MDN1/MSID is homed a short message request (SMSREQ) carrying the MDN1 for obtaining a short message reception address.

Process 602: Since the address of the primary HLR has been set on the respective secondary HLRs during opening an account for the one card multiple numbers service, the secondary HLR sends a short message reception address request to the primary HLR after receiving the short message reception address request.

Process 603: After receiving the SMDPP message, the primary HLR is aware of that the service currently occurring is a one card multiple numbers service according to subscription information, searches for the information of the subscriber card to which the called user is homed to (or the bound subscriber card) according to the MSID, and further determines the MSC that provides services for the user (i.e., MSC_S).

Process 604: The primary HLR initiates to the determined MSC_S of the callee a short message request (SMSREQ) carrying the MSID for obtaining the short message reception address.

Processes 605~607: After receiving the request, the MSC_S returns to the MC a response message carrying the short message reception address (filled as the address of the MSC_S) sequentially through the primary HLR and the secondary HLR.

Processes 608~609: The MC transmits the short message to the MSC_S through the SMDPP message according to the short message reception address in the received message. After receiving the short message, the MSC_S returns to the MC a response message indicative of reception of the short message.

In a subsequent process of issuing the short message from the MSC_S to the called terminal, the short message is issued according to the subscriber card information of the callee such as the International Mobile Subscriber Identifier (IMSI) or the Mobile Identification Number (MIN). Such subsequent connecting process is the same as a general connecting process, and therefore descriptions thereof will not be repeated here.

Figure 7:
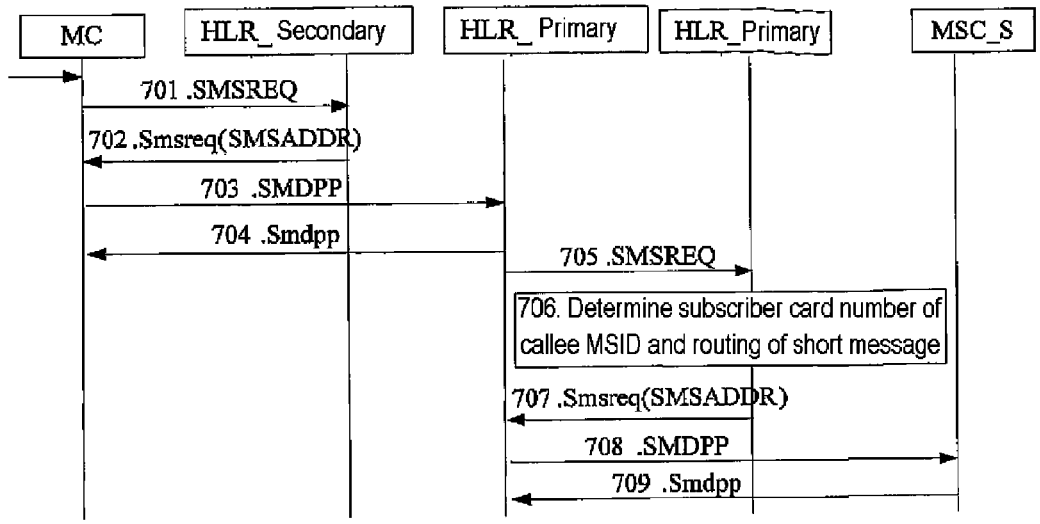
FIG. 7 is a flow chart of receiving a short message according to another embodiment.

If a message center implements routing and addressing with an MDN, then a Message Center corresponding to the primary HLR (referred to as a primary MC) may initiate during service opening a pseudo registration message with a short message address being filled as an address of the primary MC so as to inform the respective secondary HLRs. When the MC issues a short message from the callee, the short message may firstly be issued to the primary MC, and the primary MC takes charge of transferring the short message to a serving MSC for the subscriber card so as to issue the short message, and therefore the following processes can be involved with reference to FIG. 7.

Process 701: After receiving a short message, the MC to which the called number MDN1 is homed initiates to a secondary HLR to which the called user number MDN1 is homed a short message request (SMSREQ) carrying the MDN1 for obtaining a short message reception address.

Process 702: Since the address of the primary MC has been set on the respective secondary HLRs during opening an account for the one card multiple numbers service, after receiving the short message request carrying the MDN1, the secondary HLR returns the address of the primary MC as the short message reception address to the MC.

Processes 703~704: After receiving the response message, the MC transmits the short message to the primary MC through the SMDPP message according to the short message reception address carried in the response message (filled as the address of the primary MC), and the primary MC returns a response message.

Process 705: After receiving the SMDPP message, the primary MC requests the primary HLR for obtaining the short message reception address.

Processes 706~707: After receiving the request, the primary HLR is aware of that the service currently occurring is a one card multiple numbers service according to subscription information, searches for the information of the subscriber card to which the called user is homed (or the bound subscriber card) according to the MSID of the called user, and further determines the MSC that provides services for the user (i.e., MSC_S) and current routing information of the short message and returns the current routing information of the short message to the primary MC.

It shall be noted that the primary HLR if not aware of the address of the MSC_S shall also request for obtaining the address of the MSC_S, and the processes 505~506 can be made reference for such a process.

Processes 708~709: The primary MC transmits the short message to the MSC_S through the SMDPP message according to the address of the MSC_S in the received response message. After receiving the short message, the MSC_S returns to the primary MC a response message indicative of reception of the short message.

In a subsequent process of issuing the short message from the MSC_S to the called terminal, the short message is issued according to the subscriber card information of the callee such as the International Mobile Subscriber Identifier (IMSI) or the Mobile Identification Number (MIN). Such subsequent connecting process is the same as a general connecting process, and therefore descriptions thereof will not be repeated here.

Further, there can also be arranged a Gateway of Message Center (GMC) through which all short messages to be transmitted to the callee shall pass (such gateway may be one or more, and different GMCs can be arranged by different regions). The GMC can be provided with a short message transfer function, and a number for which short message transfer is required shall be configured at the GMC by setting a transfer-to number for that number (the configuration may be that transfer for respective numbers registered by the callee can be directed to the number MSID of the subscriber user). Thus when a short message passes through the GMC, the gateway queries a transfer database to see whether the transfer function has been set for the number, and if the transfer function has been set for the number, then intercepts the short message, reconstructs the short message according to content of the short message and information recorded in the database and issues the short message to a transfer-to number. Reconstruction can be made by simple replacement of a destination number or by replacement of a destination number and otherwise reservation of information of the original destination number, so that the user can be aware of the transfer-from number.

Figure 8:
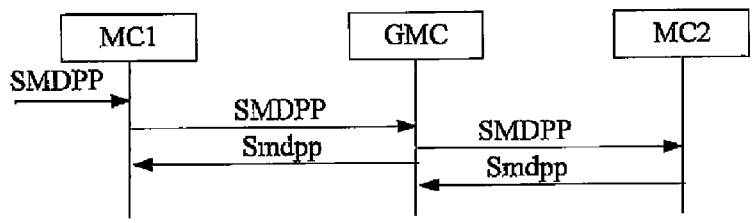
FIG. 8 is a flow chart of receiving a short message according to another embodiment.

Referring to FIG. 8, a flow of receiving a short message according to an embodiment can involve the following processes.

Process I: An MC1 receives an initial short message for issuing, and routes all short messages for issuing to a GMC to which the called number is homed.

Process II: The GMC queries its own short message transfer database to see whether the short message transfer function has been set for the called number, and if the transfer function has been set for the number, then reconstructs the short message and issues the short message to a GMC or MC to which a transfer-to number is homed. Subsequent short message issuing is the same as a general flow.

If no transfer function is set, then the GMC transmits transparently the short message to an MC2 to which the called number is homed, and the MC2 takes charge of issuing the short message in a process which is the same as an issuing process for a general short message.

Figure 9:
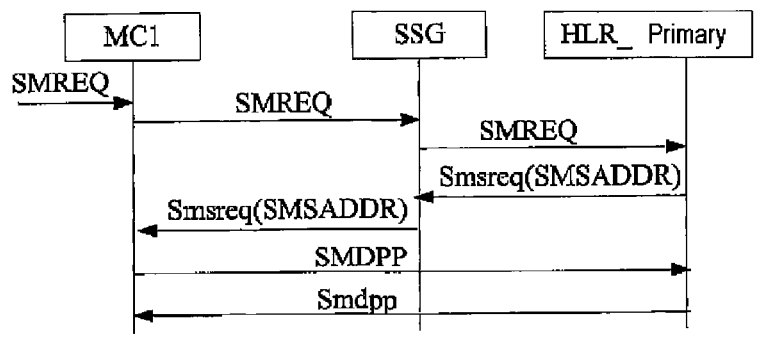
FIG. 9 is a flow chart of receiving a short message according to another embodiment.

As illustrated in FIG. 9, there can also be arranged a Short message routing Signaling Gateway (SSG) through which all signaling for querying the primary HLR about an address of a short message of the user shall pass (the gateway can be one or more, and different SSGs can be arranged by different regions), and the SSG may be provided with a function of transferring a short message to be transmitted to a secondary number to the subscriber card of the user, and the function may be implemented in a way that a number for which short message transfer is required can be configured in the SSG by setting a transfer-to number for that number, and when a short message passes through the SSG, the SSG queries a transfer database about a transfer-to number set for the number and redirects the signaling in the following ways.

a. The signaling of SMSREQ is redirected to the primary HLR, and a current short message address of the subscriber card is obtained from the primary HLR and then an MC performs an issuing.

b. A message center issues the short message directly to the SSG, and after that the SSG issues the short message to the subscriber card.

c. The short message is issued to the primary HLR, and then is issued from the primary HLR to the subscriber card.

d. The short message is issued to a primary MC to which the subscriber card is homed currently, and then is issued from the primary MC to the subscriber card.

The following transmission processes can be involved with reference to FIG. 9.

Process I: After receiving an initial short message to the callee, an MC firstly sends to the SSG gateway the signaling for querying the primary HLR about a short message address of the user.

Process II: The SSG determines a transfer-to subscriber card number MSID according to the called number, reconstructs the signaling for querying about the short message address of the user, and forwards the signaling to an HLR to which the subscriber card number is homed. When the signaling arrives at the primary HLR, the primary HLR determines and returns the short message reception address to the MC, and thus the MC transmits the short message to the callee according to the address.

Alternatively, dynamic user information of a secondary number may be directly set through an accounting system and the address of the primary HLR/MC/SCO may be set as the short message address, thus attaining the same effect as pseudo registration. Also, a secondary HLR may deem an address of the primary MC/portal MC as the current short message address of the secondary number and forward a short message to the preset address.

Figure 10:
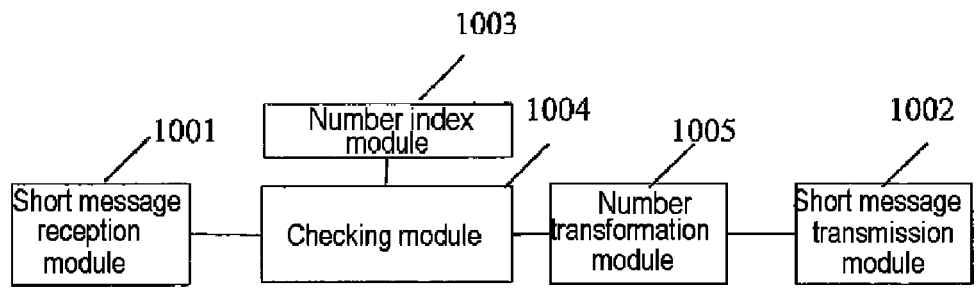
FIG. 10 is a schematic diagram of a structure of a short message center according to an embodiment.

Correspondingly, the present disclosure also provides a short message center as illustrated in FIG. 10 including a short message reception module 1001 and a short message transmission module 1002 and also includes:

a number index module 1003, adapted to store different user telephone numbers registered by a user of the one card multiple numbers service and corresponding different indexes (which can be different city codes corresponding to the different telephone numbers);

a checking module 1004, adapted to determine whether number transformation is required for a short message transmitted from the short message reception module, read a telephone number corresponding to an index field from the number index module, and transmit the telephone number along with the short message to a number transformation module upon determination of a need of number transformation; and the number transformation module 1005, adapted to transform a calling telephone number in the short message transmitted from the checking module into the telephone number corresponding to the index field, and provide the short message to the short message transmission module for transmission.

A method for displaying to a callee a number called by a caller and dialing back according to an embodiment includes the following processes.

The first process: In the case that a user B of the one card multiple numbers service acts as a callee, when a calling user A calls a number MDN_B1 registered by the called user B, information of the called number MDN_B1 is carried.

The information includes the called number MDN_B1 or an identifier uniquely corresponding to the called number, such as an index number, a different home city code corresponding to the different number during registration.

The information may be carried in a message body. For example, the information can be placed as a prefix in a calling number MDN_A in order for convenient dialing back for the called user B.

The second process: The network side identifies the information of the called number MDN_B1 according to the call information and sends the information to a called terminal for display to the callee; or, when the called user B receives the call information, the information of the called number MDN_B1 is displayed to the callee.

The third process: The called user sends to the network the information of the called number MDN_B1 previously sent to the called user B along with the calling number MDN_A previously calling the callee when the called user dials back the original calling user A according to a dial back function in the terminal.

Number conversion is performed through the network by transforming the number dialed back in the second process into the number of the original calling user A (e.g., with removal of the prefix) and if necessary, by replacing the number of the called user B with the MDN_B1 information in the received dial back information and providing the information to the dialed back user A, the number of the user B displayed to the user A will be the number that the user A ever dialed.

Descriptions will be given here by way of an example in which a number displayed to a one card multiple numbers service user is "#XXX*number", where XXX denotes an index of a secondary number. During dialing back, the called number is modified through the network side by removing the prefix #XXX* and the calling number is modified through the network side by searching out a corresponding secondary number according to the index #XXX* and replacing the current calling number with the secondary number for further connecting.

Figure 11:
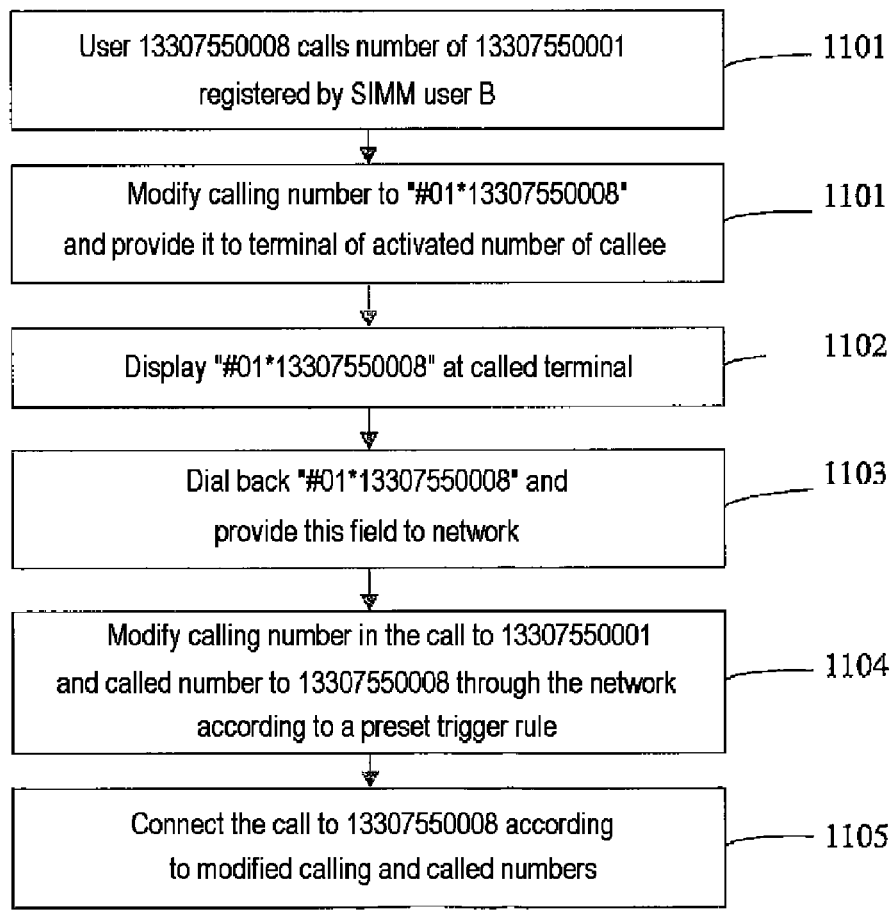
FIG. 11 is a flow chart of displaying to a callee a number dialed by a caller and dialing back according to an embodiment.

Detailed descriptions will be given below with reference to FIG. 11. In the present example, it is assumed that a one card multiple numbers service user B registers five numbers of 13307550001~5 corresponding to indexes of 01~05 respectively, and the current activated number (i.e., a number currently used) of the one card multiple numbers service user B is 13307550002. Another user A has a number of 13307550008.

Process 1101: The user A with the number of 13307550008 calls the number of 13307550001 registered by the one card multiple numbers service user B. During connecting the call, the communication system transfers the call to a terminal with the number of 13307550002 of the user B according to the current activated number of the user B, modifies content of the calling number field to "#01*13307550008" (of course the content may also be modified to "#13307550001*13307550008") and provides them along with the call to the called user terminal. Where, 01 is the index of the number 13307550001.

Process 1102: The one card multiple numbers service user terminal in reception of the call displays the calling number field, and the called user B can be aware of that the calling number 13307550008 has called the number 13307550001 according to the prefix field in the displayed calling number. The prefix field in this example is the index of 01 which corresponds to the first MDN number 13307550001 registered by the user B. In another example, a number can be determined in correspondence with a city code when indexes are city codes and the different city codes correspond to different registered numbers.

Process 1103: The one card multiple numbers service user B provides the network with the number of "#01*13307550008" (or "#13307550001*13307550008") when replaying to the call through the dial back function. Dialing back here includes dialing back the displayed number through the dial back function provided in the terminal or dialing back through entering the displayed number by the user.

Process 1104: The calling number and the called number during the call are modified through the network according to a preset trigger rule (or possibly a trigger can be subscribed to at the HLR), such as upon detection of the character "#" included in the dialed back number. The modification includes: "#01*" is extracted from the dialed back number according to the preset rule to obtain the true number of 13307550008 dialed back as a callee field in the message, the corresponding MDN number of 13307550001 is found according to the index of 01 and the original calling number field of 13307550002 (the current activated number) in the call information is replaced with 13307550001.

It shall be noted that format characters may not be limited to x, # or the like, but also can be other characters such as 107. Naturally, there may also be only one format character, and removal of the format character may be implemented according to the length, such as 10701, where 107 is a format character and 01 is an index. In this way, the format character shall not be an already existing number or number beginning.

Process 1105: The call is then connected to the user of 13307550008 according to the modified calling and called numbers, and a subsequent connecting flow is the same as a general flow. As can be seen, in the call message at this time, the called number field is 13307550008 and the calling number field is 13307550001. Upon reception of the call by the user of 13307550008, the number of the one card multiple numbers service user displayed is the number of 13307550001, and the user of 13307550008 is aware neither of current inactivation of the number 13307550001 nor of the presence of the number 13307550002.

The above procedure may be equally applied to transmission and reply of a short message except that a call message is replaced correspondingly with a short message for transmission of the message. Functions of a control entity for the one card multiple numbers service may be implemented by a message center. Thus, a message center to which a one card multiple numbers service subscriber card is homed implements the operations of modifying a calling number and a called number.

There is provided a control entity for implementing one card multiple numbers service according to an embodiment, which includes:

a storage unit, adapted to store information of numbers registered by a one card multiple numbers service user;

a determination unit, adapted to determine whether a called number is one of the numbers of the one card multiple numbers service user; and a processing unit, adapted to process connecting of a call for the one card multiple numbers service user, determine subscriber card information of a called terminal, a current activated number and a Serving Mobile Switching Center MSC_S that provides services for the activated number according to the called number and based upon the stored information of the numbers registered by the one card multiple numbers service user, and obtain routing information of the MSC_S so as to connect the call to the MSC_S.

A procedure of calling a one card multiple numbers service user will be described in further details below with reference to specific flows.

Figure 12:
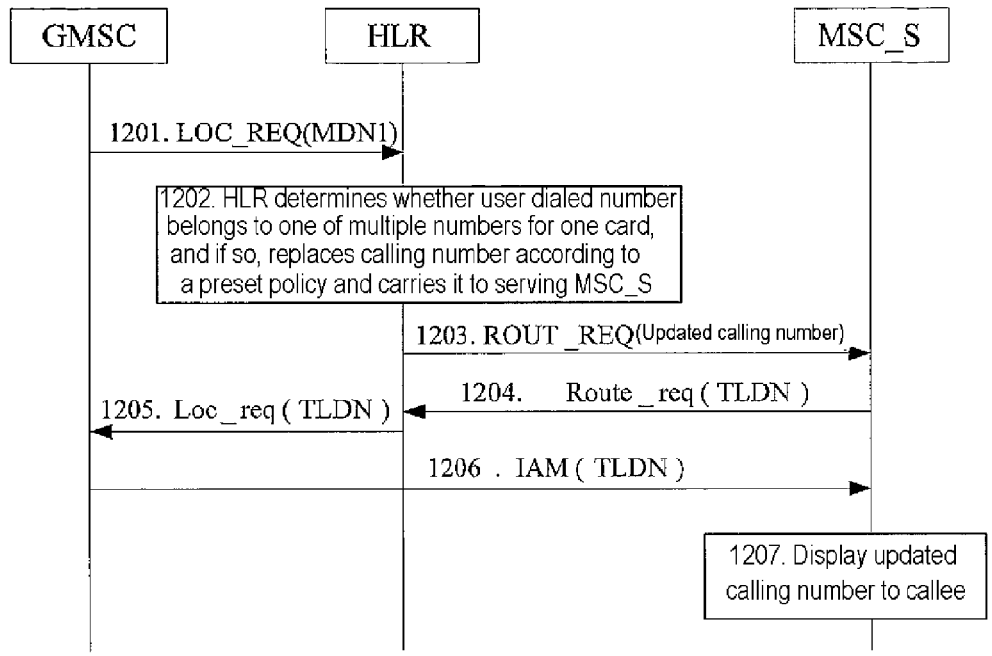
FIG. 12 is a flow chart of calling a user of one card multiple numbers service according to an embodiment.

A control entity for the one card multiple numbers service which reports a call to the network may be implemented by an HLR/SCP/pilot MSC/GMSC/VMSC, and by an HLR or SCP because all numbers registered by a one card multiple numbers service user are recorded on an HLR/SCP. The HLR acts as a control entity for a one card multiple numbers service by way of example below. The following processes may be involved with reference to FIG. 12.

Process 1201: After receiving a call directed to a number registered by a one card multiple numbers service user B, the GSMC sends call information through a location request message to an HLR to which the called user B is homed.

Process 1202: The HLR determines whether the called number is for a one card multiple numbers service user, and performs replacement on the calling number according to a preset policy when determines that the callee is a one card multiple numbers service user and that there is a need of displaying the original called number or supporting a dial back function. For example, the content of the caller field may be replaced with "#01*13307550008" (or with "#13307550001*13307550008").

Process 1203: The HLR provides the replaced calling number for a serving MSC that currently provides services for the called user B through a routing request message and requests routing information of the serving MSC.

Processes 1204~1206: The serving MSC returns the routing information to the GMSC through the HLR, and the GMSC routes the call information to the serving MSC according to the routing information.

Process 1207: The serving MSC sends the replaced calling "#01*13307550008" to the called terminal for displaying to the called user during subsequent process of calling the callee.

Figure 13:
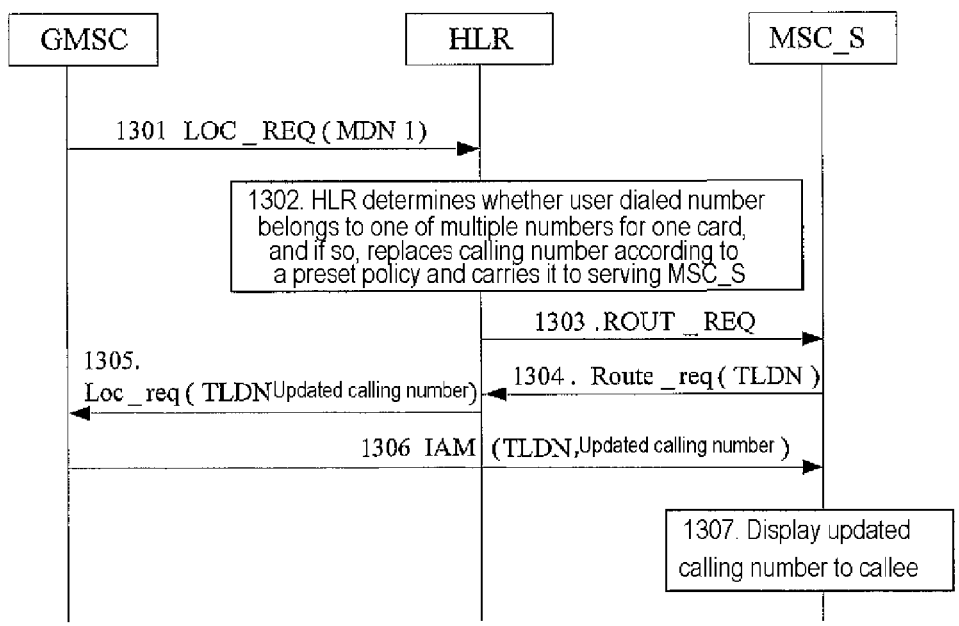
FIG. 13 is a flow chart of calling a user of one card multiple numbers service according to an embodiment.

In addition, as illustrated in FIG. 13, the HLR provides the replaced calling number for the GMSC through a response message in a process 1205 instead of providing the calling number for the serving MSC in the process 1203, and the GMSC provides the calling number for the MSC in a process 1206.

Alternatively, the HLR only provides relevant information (e.g., the called number and the index) for the serving MSC or the GMSC without any operation of modifying the calling number and instructs the serving MSC or the GMSC to perform the operation of modifying the calling number through a command, and the serving MSC or the GMSC modifies the calling number in response to the instruction from the HLR and provides the modified calling number to the callee. Thus, the equivalent effect may be attained.

Figure 14:
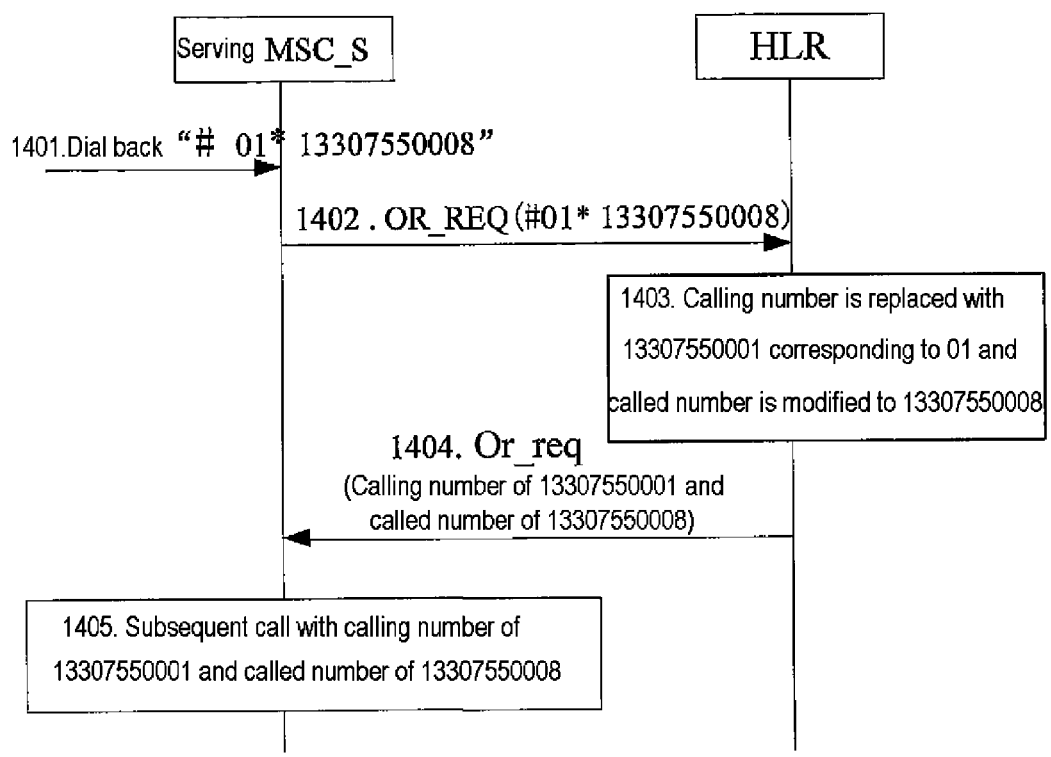
FIG. 14 is a flow chart of calling back from a user of one card multiple numbers service according to an embodiment.

Referring to FIG. 14, the dial back method will be described by way of an example in which a one card multiple numbers service user B calls a user A in a dial back way, and a control entity for the one card multiple numbers service is still implemented by an HLR in this example.

Process 1401: The one card multiple numbers service user B on sight of a displayed number calls the user A in a dial back way that call information is sent to the serving MSC to which the user B is homed with contents of the calling number being filled as "#01*13307550008".

Process 1402: After receiving the call, the serving MSC sends the call information to the HRL according to a trigger to which the one card multiple numbers service user B subscribes (subscribes at the HLR in advance).

Of course, a feature code (or referred to as a prefix field) may also be adopted in way that the call information is sent to the HLR upon detection of the feature code (which can be preset as "#" for example).

Process 1403: The HLR modifies the calling number and the called number according to a preset policy. For example, "#01*" is extracted from the called number according to the preset rule to obtain the true number of 13307550008 dialed back as a callee field in the message, the corresponding number of 13307550001 is searched out by using to the index of 01 and the original called number field of 13307550002 in the call information is replaced (the current activated number) with 13307550001.

Process 1404: The modified information is returned to the serving MSC, and the serving MSC calls with the modified calling and called numbers. It can be seen that during the subsequent call, the calling number is the number of the user B that the user A originally dialed, and thus the number of the user B that the user A originally dialed is also displayed at the terminal when the user A receives the call.

Of course, in the process 1403, the HLR may only provides relevant information (e.g., the called number and the index) for the serving MSC without any operation of modifying the calling number and instructs the serving MSC to perform the operation of modifying the calling number through a command, and the serving MSC modifies the calling number in response to the instruction from the HLR and provides the modified calling number to the callee. Thus, the equivalent effect may be attained.

The foregoing descriptions are merely illustrative of the embodiments but not limitative of the present disclosure, and any modifications, equivalent substitutions and adaptations made without departing from the spirit and principle of the present disclosure shall fall within the scope of the present disclosure as defined in the appended claims.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for implementing one card multiple numbers service, a subscriber card of a called terminal being bound with a plurality of numbers, comprising:

receiving a call carrying a called number of a called terminal;

determining subscriber card information of the called terminal, a current activated number of the called terminal and a serving Mobile Switching Center (MSC_S) that provides services for the activated number according to the called number;

obtaining routing information of the MSC_S and connecting the call to the MSC_S according to the routing information of the MSC_S; and implementing subsequent connecting of the call according to the subscriber card information of the called terminal;

wherein the determining subscriber card information of the called terminal, the current activated number of the called terminal and the serving Mobile Switching Center (MSC_S) that provides services for the activated number according to the called number comprises:

receiving, by a secondary Home Location Register (HLR) to which the called number is homed, a location request carrying the called number;

sending, by the secondary HLR, a route request carrying the called number information to a primary HLR where respective registered numbers of a called user are stored; and determining, by the primary HLR, the subscriber card information of the called terminal, the current activated number of the called terminal and the MSC_S that provides services for the activated number according to the called number.

2. The method according to claim 1, further comprising: before the determining of the subscriber card information of the called terminal, the current activated number of the called terminal and the MSC_S that provides services for the activated number according to the called number, informing, by the primary HLR, an address or routing information of the primary HLR of respective secondary HLRs;

recording, by the respective secondary HLRs, the address or routing information of the primary HLR.

3. The method according to claim 1, further comprising: before the determining the subscriber card information of the called terminal, the current activated number of the called terminal and the MSC_S that provides services for the activated number according to the called number, setting, by respective secondary HLRs, an address of the primary HLR as an address of a currently serving MSC/VLR through a Business Operation Support System.

4. The method according to claim 1, further comprising: before the determining of the subscriber card information of the called terminal, the current activated number of the called terminal and the MSC_S that provides services for the current activated number according to the called number, receiving, by the primary HLR, a registration request carrying information of the MSC_S that provides services for the subscriber card of the called terminal, and determining the currently activated number for the subscriber card according to the information of the MSC_S.

5. The method according to claim 1, wherein the obtaining the routing information of the MSC_S and the connecting the call to the MSC_S according to the routing information comprise:
    initiating, by the primary HLR, a routing request to the MSC_S carrying the called number and the current activated number of the called terminal;
    sending, by the MSC_S, a temporary local number carrying the routing information of the MSC_S to the primary HLR;
    transmitting, by the primary HLR, the temporary local number to an original Mobile Switching Center MSC_O; and
    connecting, by the MSC_O, the call to the MSC_S according to the routing information carried in the temporary local number.

6. The method according to claim 1, wherein the obtaining the routing information of the MSC_S and the connecting of the call to the MSC_S according to the routing information comprise:
    connecting, by an original Mobile Switching Center (MSC_O), the call to a pilot Mobile Switching Center (MSC_P) according to a routing information of the MSC_P;
    obtaining, by the MSC_P, the routing information of the MSC_S from the primary HLR; and
    connecting, by the MSC_P, the call to the MSC_S according to the routing information of the MSC_S.

7. A method for implementing one card multiple numbers service, a subscriber card of a called terminal being bound with a plurality of numbers, comprising:
    receiving a call carrying a called number of a called terminal;
    determining subscriber card information of the called terminal, a current activated number of the called terminal and a serving Mobile Switching Center (MSC_S) that provides services for the activated number according to the called number:
    obtaining routing information of the MSC_S and connecting the call to the MSC_S according to the routing information of the MSC_S; and
    implementing subsequent connecting of the call according to the subscriber card information of the called terminal;
    wherein the determining the subscriber card information of the called terminal, the current activated number of the called terminal and the MSC_S that provides services for the activated number according to the called number comprises:
    obtaining, by an original Mobile Switching Center (MSC_O), routing information of a pilot Mobile Switching Center (MSC_P) through a secondary Home Location Register (HLR) to which the called number is homed;
    connecting, by the MSC_O, the call to the MSC_P according to the routing information of the MSC_P;
    sending, by the MSC_P, a first location request carrying the called number to a primary HLR where respective registered numbers of a called user are stored; and
    determining, by the primary HLR, the subscriber card information of the called terminal, the current activated number of the called terminal and the MSC_S that provides services for the activated number according to the called number.

8. The method according to claim 7, wherein the obtaining routing information of the MSC_S and connecting the call to the MSC_S according to the routing information of the MSC_S comprise:
    sending, by the MSC_P, a second location request to the primary HLR for requesting the routing information of the MSC_S;
    receiving, by the MSC_P, the routing information of the MSC_S and connecting the call to the MSC_S according to the routing information of the MSC_S.

9. The method according to claim 1, further comprising:
    displaying the called number information to the called terminal.

10. The method according to claim 9, wherein the displaying the called number to the called terminal comprises:
    placing the called number information in a calling number field of the call.

11. A method for implementing short message service for a user of one card multiple numbers service, comprising:
    receiving a short message carrying a called number of a called terminal;
    determining subscriber card information of the called terminal and a serving Mobile Switching Center (MSC_S) that provides services for the subscriber card according to the called number;
    obtaining routing information of the MSC_S and routing the short message to the MSC_S according to the routing information of the MSC_S; and
    implementing, by the MSC_S, subsequent transmission of the short message;
    wherein the determining of the subscriber card information of the called terminal and a serving Mobile Switching Center (MSC_S) that provides services for the subscriber card according to the called number comprises:
    sending, by a Message Center (MC) to which the called number is homed, the short message to a primary HLR where respective registered numbers of a called user are stored; and
    determining, by the primary HLR, the subscriber card information of the called terminal and the MSC_S that provides services for the subscriber card according to the called number;
    wherein the sending the short message to the primary HLR comprises:
    sending, by the MC, a short message reception address request carrying the called number to a secondary HLR to which the called number is homed; returning, by the secondary HLR, address information of the primary HLR according to the recorded address information of the primary HLR to which the called number of the call is homed; and
    sending, by the MC, the short message to the primary HLR according to the address information of the primary HLR.

12. The method according to claim 11, further comprising:
    before determining the subscriber card information of the called terminal and the serving Mobile Switching Center (MSC_S) that provides services for the subscriber card,
    informing, by the primary HLR, respective secondary HLRs to which the respective numbers bound with the subscriber card of the called terminal are homed of routing information of the primary HLR, and recording, by the respective secondary HLRs, the address information of the primary HLR.

13. A method for dialing back by a user, wherein, a calling terminal has initiated a call carrying a first number of a called terminal, the called terminal has subscribed to one card multiple numbers service, the call has been connected to a second number of a called terminal, and a calling number field has displayed on the called terminal containing information about the first number of the called terminal and the calling terminal number, and the method of dialing back by the second number of the called terminal comprises:
- receiving a dial back call made from the second number of the called terminal, a called number in the dial back call carrying information about the first number of the called terminal and the calling terminal number;
- determining the calling terminal number as the called number in the dial back call, and implementing the dial back call according to the determined called number in the dial back call.

14. The method according to claim 13, wherein the called number in the dial back call further carries a feature code, and before the determining the calling terminal number as the called number in the dial back call, further comprises:
- extracting the information about the first number of the called terminal and the calling terminal number according to the feature code.

15. The method according to claim 13, further comprising: modifying a calling number in the dial back call to the information about the first number of the called terminal.

16. The method according to claim 13, wherein the information about the first number of the called terminal comprises: the first number of the called terminal or an index of the first number of the called terminal.

17. The method according to claim 14, wherein the feature code comprises a specific field, a specific character string.

18. A system for implementing one card multiple numbers service, comprising:
- a primary Home Location Register (HLR), adapted to store information of all numbers registered by a one card multiple numbers service user, and upon reception of a call to a called terminal, determine subscriber card information of the called terminal, a current activated number of the called terminal and a serving Mobile Switching Center (MSC_S) that provides services for the activated number according to a called number, and obtain routing information of the MSC_S;
- a secondary Home Location Register (HLR), adapted to receive a location request carrying the called number from an original Mobile Switching Center (MSC_O), send a route request carrying the called number information to the primary HLR, and store address or routing information of the primary HLR to which the one card multiple numbers service user is homed; and
- the MSC_O, adapted to receive the call directed to the called number, send the location request carrying the called number to the secondary HLR;
- the MSC_S, adapted to implement subsequent connecting of the call according to the subscriber card information of the called terminal.

19. The system according to claim 18, comprising:
- the MSC_O, further adapted to connect the call to a pilot Mobile Switching Center (MSC_P) according to a routing information of the MSC_P;
- the MSC_P, adapted to obtain the routing information of the MSC_S from the primary HLR; and connect the call to the MSC_S according to the routing information of the MSC_S.

20. A system for implementing one card multiple numbers service, comprising:
- a primary Home Location Register (HLR), adapted to store information of all numbers registered by a one card multiple numbers service user, and upon reception of a first location request carrying a called number of a called terminal from a pilot Mobile Switching Center (MSC_P), determine subscriber card information of the called terminal, a current activated number of the called terminal and a serving Mobile Switching Center (MSC_S) that provides services for the activated number according to the called number, obtain routing information of the MSC_S, and connect the call to the MSC_S according to the routing information of the MSC_S;
- the MSC_P, adapted to send the first location request carrying the called number to the primary HLR,
- an original Mobile Switching Center MSC_O, adapted to receive a call carrying the called number of the called terminal, obtain route information of the MSC_P through a secondary Home Location Register (HLR) to which the called number is homed, and connect the call to the MSC_P according to the routing information of the MSC_P;
- the MSC_S, adapted to implement subsequent connecting of the call according to the subscriber card information of the called terminal.

21. The method according to claim 1, further comprising: before the determining the subscriber card information of the called terminal, the current activated number of the called terminal and the MSC_S that provides services for the activated number according to the called number,
- initiating, by an MSC/VLR corresponding to the primary HLR, a registration message to respective secondary HLRs where an address of the currently serving MSC/VLR is recorded as an address of the primary HLR.

* * * * *

UNITED STATES PATENT AND TRADEMARK OFFICE
CERTIFICATE OF CORRECTION

PATENT NO. : 8,224,358 B2  Page 1 of 1
APPLICATION NO. : 12/242193
DATED : July 17, 2012
INVENTOR(S) : Shiqian Li It is certified that error appears in the above-identified patent and that said Letters Patent is hereby corrected as shown below:

In the Title Page:

Item (56) References Cited, FOREIGN PATENT DOCUMENTS: Please insert the following --CN    1194084    09/1998--.

Signed and Sealed this
Fourth Day of September, 2012

David J. Kappos
*Director of the United States Patent and Trademark Office*